(12) United States Patent
Karczewicz et al.

(10) Patent No.: US 11,228,763 B2
(45) Date of Patent: Jan. 18, 2022

(54) RESIDUAL CODING TO SUPPORT BOTH LOSSY AND LOSSLESS CODING

(71) Applicant: QUALCOMM Incorporated, San Diego, CA (US)

(72) Inventors: Marta Karczewicz, San Diego, CA (US); Hongtao Wang, San Diego, CA (US); Alican Nalci, San Diego, CA (US); Muhammed Zeyd Coban, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/131,046

(22) Filed: Dec. 22, 2020

(65) Prior Publication Data

US 2021/0203934 A1   Jul. 1, 2021

Related U.S. Application Data

(60) Provisional application No. 62/953,872, filed on Dec. 26, 2019.

(51) Int. Cl.
| | | |
|---|---|---|
| *H04N 19/12* | (2014.01) | |
| *H04N 19/18* | (2014.01) | |
| *H04N 19/176* | (2014.01) | |
| *H04N 19/60* | (2014.01) | |

(52) U.S. Cl.
CPC ........... *H04N 19/12* (2014.11); *H04N 19/176* (2014.11); *H04N 19/18* (2014.11); *H04N 19/60* (2014.11)

(58) Field of Classification Search
CPC ...... H04N 19/12; H04N 19/18; H04N 19/176; H04N 19/60; H04N 19/91; H04N 19/70
See application file for complete search history.

(56) References Cited

U.S. PATENT DOCUMENTS

2015/0341641 A1   11/2015   Kolesnikov et al.
2018/0352226 A1*  12/2018   An .................... H04N 19/12

FOREIGN PATENT DOCUMENTS

| EP | 2858355 A1 | 4/2015 |
| EP | 2999218 A1 | 3/2016 |

OTHER PUBLICATIONS

Auyeung C., et al., "CE7-related: Modifications to Transform Skip Significant Flag Coding", JVET-P0435, Joint Video Experts Team (JVET) of ITU-T SG 16 WP 3 and ISO/IEC JTC 1/SC 29/WG 11, 16th Meeting, Geneva, CH, Oct. 1-11, 2019, pp. 1-10.
Bross B., et al., "Versatile Video Coding (Draft 10)", JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 551 Pages.

(Continued)

*Primary Examiner* — Nam D Pham
(74) *Attorney, Agent, or Firm* — Shumaker & Sieffert, P.A.

(57) ABSTRACT

An example device includes memory configured to store video data and one or more processors implemented in circuitry and coupled to the memory. The one or more processors are configured to determine whether transform skip mode is used for a current block of the video data. The one or more processors are configured to disable level mapping for residual coding based on transform skip mode being used for the current block. The one or more processors are configured to code the current block without applying level mapping.

29 Claims, 11 Drawing Sheets

(56) References Cited

OTHER PUBLICATIONS

Bross B., et al., "Versatile Video Coding (Draft 6)", 127th MPEG and 15th JVET Meeting, Jul. 3, 2019-Jul. 12, 2019, Gothenburg (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 pp. Retrieved from the Internet: URL:http://phenix.int-evry.fr/mpeg/doc_end_user/documents/127Gothenburg/wg11/m49908-JVET-O2001-v14-JVET-O2001-vE.zip, JVET-O2001-vE.docx [retrieved on Jul. 15, 2019].

Bross B., et al., "Versatile Video Coding (Draft 7)", 16. JVET Meeting, Oct. 1, 2019-Oct. 11, 2019, Geneva (The Joint Video Exploration Team of ISO/IEC JTC1/SC29/WG11 and ITU-T SG.16), No. JVET-P2001, Nov. 14, 2019 (Nov. 14, 2019), XP030224330, 494 Pages Retrieved from the Internet: URL: http://phenix.int-evry.fr/jvet/doc_end_user/documents/16_Geneva/wg11/JVET-P2001-v14.zip JVET-P2001-vE.docx [retrieved on Nov. 14, 2019].

International Search Report and Written Opinion—PCT/US2020/066879—ISA/EPO—dated Feb. 12, 2021.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Karczewicz (Qualcomm) M, et al., "CE3-related: Modified TS Residual Coding", 17. JVET Meeting, Jan. 7, 2020-Jan. 17, 2020, Brussels (The Joint Video Exploration Team of ISO/IEC JTC1/SC29/WG11 and ITU-TSG.16), No. 1, JVET-Q0489-v2, Jan. 3, 2020 (Jan. 3, 2020), XP030223673, pp. 1-7, Retrieved from the Internet: URL: http://phenix.int-evry.fr/jvet/doc_end_user/documents/17_Brussels/wg11/JVET-Q0489-v3.zip JVET-Q0489-v2-clean.docx.

Karczewicz (Qualcomm) M., et al., "CE7: Sign Context, Level Mapping, and Bitplane Coding for TS Residual Coding (CE7-3.7, CE7-3.8, CE7-3.9, CE7-3.10, and CE7-3.11)", JVET-O0122-v2, 15. JVET Meeting; Jul. 3, 2019-Jul. 12, 2019; Gothenburg (The Joint Video Exploration Team of ISO/IEC JTC1/SC29/WG11 and ITU-T SG.16), No. JVET-O0122, pp. 1-22, Jun. 19, 2019, XP030205692, Retrieved from the Internet: URL: http://phenix.int-evry.fr/jvet/doc_end_user/documents/15_Gothenburg/wg11/JVET-O0122-v1.zip JVET-O0122-v1.docx [retrieved on Jun. 19, 2019].

Kato (Panasonic) Y., et al., "CE3-related: Issue of Level Mapping in Transform Skip Residual", 17. JVET Meeting; Jan. 7, 2020-Jan. 17, 2020; Brussels (The Joint Video Exploration Team of ISO/IEC JTC1/SC29/WG11 and ITU-T SG.16), No. JVET-Q0143, Dec. 31, 2019 (Dec. 31, 2019), pp. 1-7, XP030222692, Retrieved from the Internet: URL: http://phenix.int-evry.fr/jvet/doc_end_user/documents/17_Brussels/wg11/JVET-Q0143-v1 .zip JVET-Q0143/JVET-Q0143.docx [retrieved on Dec. 31, 2019].

Sarwer (Alibaba-Inc) M.G., et al., "CE7-Related: Simplified Two-Pass Transform-Skip Residual Coding", 16. JVET Meeting; Oct. 1, 2019-Oct. 11, 2019; Geneva (The Joint Video Exploration Team of ISO/IEC JTC1/SC29/WG11 and ITU-T SG. 16), No. JVET-P0397, Oct. 4, 2019 (Oct. 4, 2019), pp. 1-6, XP030217190, Retrieved from the Internet: URL: http://phenix.int-evry.fr/jvet/doc_end_user/documents/16_Geneva/wg11/JVET-P0397-v3.zip JVET-P0397-v3.docx [retrieved on Oct. 4, 2019].

\* cited by examiner

RESIDUAL CODING TO SUPPORT BOTH LOSSY AND LOSSLESS CODING

This patent application claims the benefit of U.S. Provisional Patent Application No. 62/953,872, filed Dec. 26, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, mobile phones (such as cellular or satellite radio telephones or so-called "smart phones") video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video coding and more particularly techniques for residual coding for transform skip mode that is suitable for both lossy and lossless coding. This disclosure is related to an entropy decoding process that converts a binary representation to a series of non-binary valued quantized coefficients. The corresponding entropy encoding process, which is the reverse process of entropy decoding, is implicitly specified and therefore is part of this disclosure as well, although not necessarily explicitly described here. The examples of this disclosure may be applied to any of the existing video codecs, such as extensions of High Efficiency Video Coding (HEVC) or Versatile Video Coding (VVC), be proposed as a coding tool to standards currently being developed, and/or be used with other future video coding standards.

In one example, a method includes determining whether transform skip mode is used for a current block of the video data, based on transform skip mode being used for the current block, disabling level mapping for residual coding, and coding the current block without applying level mapping.

In another example, a device includes memory configured to store the video data, and one or more processors implemented in circuitry and coupled to the memory, the one or more processors being configured to: determine whether transform skip mode is used for a current block of the video data; based on transform skip mode being used for the current block, disable level mapping for residual coding; and code the current block without applying level mapping.

In another example, a device includes means for determining whether transform skip mode is used for a current block of the video data, means for disabling level mapping for residual coding based on transform skip mode being used for the current block, and means for coding the current block without applying level mapping.

In another example, a non-transitory computer-readable storage medium is encoded with instructions which, when executed, cause one or more processors to determine whether transform skip mode is used for a current block of the video data, based on transform skip mode being used for the current block, disable level mapping for residual coding, and code the current block without applying level mapping.

The details of one or more examples are set forth in the accompanying drawings and the description below. Other features, objects, and advantages will be apparent from the description, drawings, and claims.

DETAILED DESCRIPTION

In some video coding standards, one residual coding technique is used for lossy coding and another residual coding technique is used for lossless coding. As such, if a video encoder decides to use a combined lossy/lossless encoding technique, the video encoder may be unable to adapt to the lossy/lossless encoding technique or the performance of the video encoder may decrease because that would require the video encoder to use two different residual coding techniques.

In accordance with the techniques of this disclosure, transform skip residual coding techniques may be the same for both lossy and lossless coding. These techniques may improve video encoder and decoder performance (e.g., reduce processing power consumption) and/or reduce coding latency.

Figure 1:
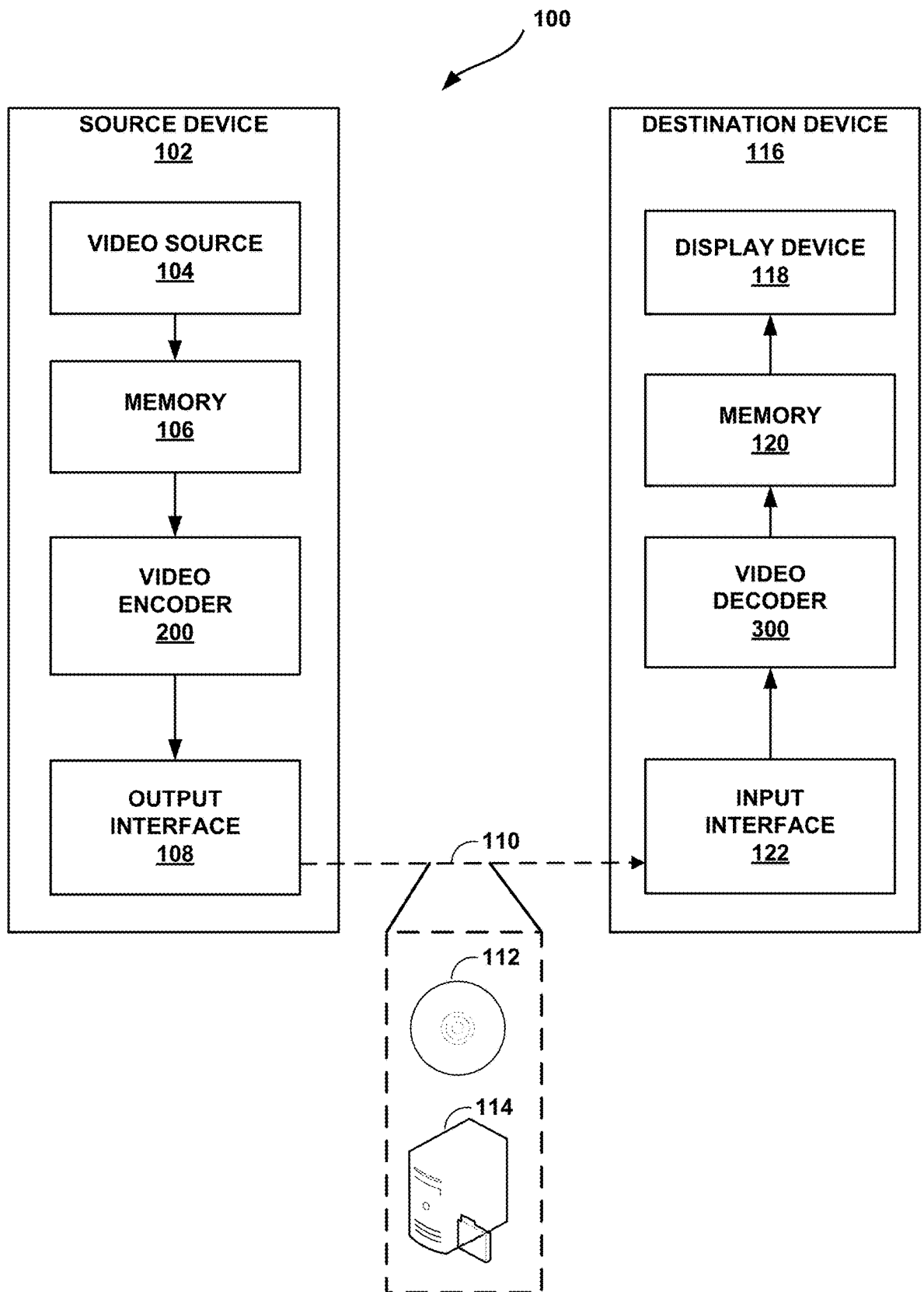
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, video encoding and decoding system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for residual coding for transform skip mode that is suitable for both lossy and lossless coding. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

Video encoding and decoding system 100 as shown in FIG. 1 is merely one example. In general, any digital video encoding and/or decoding device may perform techniques for residual coding for transform skip mode that is suitable for both lossy and lossless coding. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, video encoding and decoding system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memory 106 and memory 120 may store raw video data, e.g., raw video from video source 104 and raw, decoded video data from video decoder 300. Additionally or alternatively, memory 106 and memory 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 7)," Joint Video Experts Team (JVET) of ITU-T SG 16 WP 3 and ISO/IEC JTC 1/SC 29/WG 11, 16$^{th}$ Meeting: Geneva, CH, 1-11 Oct. 2019, JVET-P2001-v14 (hereinafter "VVC Draft 7"). A more recent draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 19$^{th}$ Meeting: by Teleconference, 22 Jun.-1 Jul. 2020, JVET-S2001-v17 (hereinafter "VVC Draft 10") The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients (or skipping a transform such as in the case of transform skip mode), video encoder 200 may perform quantization of the transform coefficients (or of the non-transformed coefficients). Quantization generally refers to a process in which transform coefficients (or non-transformed coefficients) are quantized to possibly reduce the amount of data used to represent the transform coefficients (or non-transformed coefficients), providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, a method includes determining whether transform skip mode is used for a current block of the video data, based on transform skip mode being used for the current block, disabling level mapping for residual coding, and coding the current block without applying level mapping.

In accordance with the techniques of this disclosure, a device includes memory configured to store video data and one or more processors implemented in circuitry and coupled to the memory, the one or more processors being configured to: determine whether transform skip mode is used for a current block of the video data; based on transform skip mode being used for the current block, disable level mapping for residual coding; and code the current block without applying level mapping.

In accordance with the techniques of this disclosure, means for determining whether transform skip mode is used for a current block of the video data, means for disabling level mapping for residual coding based on transform skip mode being used for the current block, and means for coding the current block without applying level mapping.

In accordance with the techniques of this disclosure, a non-transitory computer-readable storage medium is encoded with instructions which, when executed by one or more processors, cause the one or more processors to determine whether transform skip mode is used for a current block of the video data, based on transform skip mode being used for the current block, disable level mapping for residual coding, and code the current block without applying level mapping.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
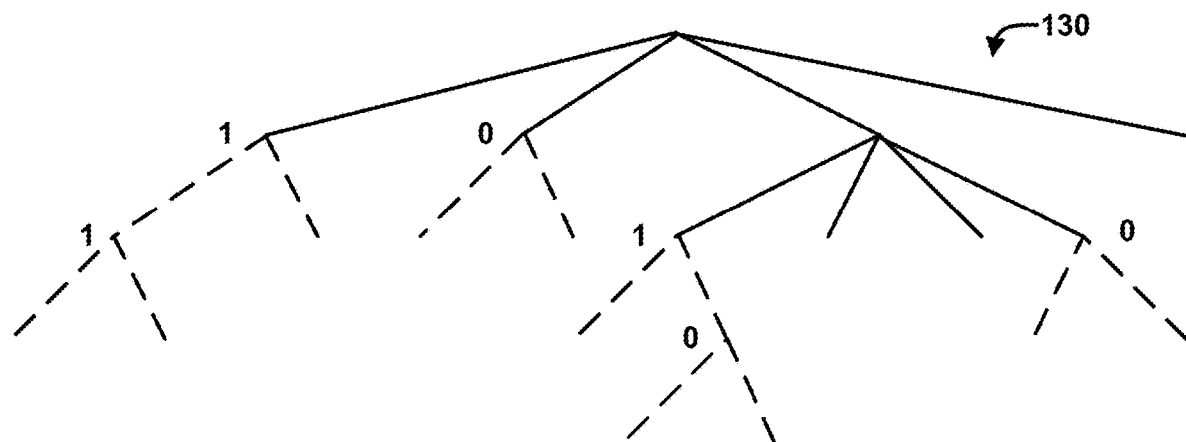
FIGS. 2A and 2B are conceptual diagrams illustrating an example quadtree binary tree (QTBT) structure, and a corresponding coding tree unit (CTU).
Figure 2B:
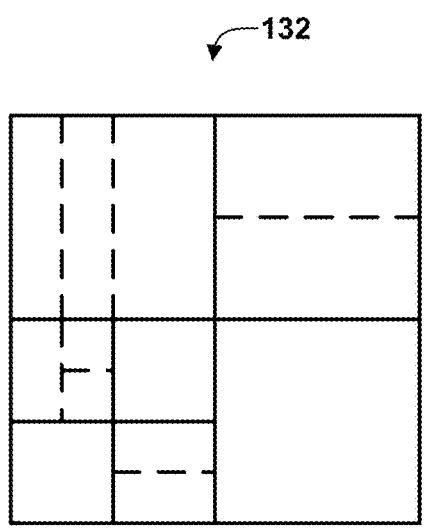

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, the leaf quadtree node will not be further split by the binary tree, because the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
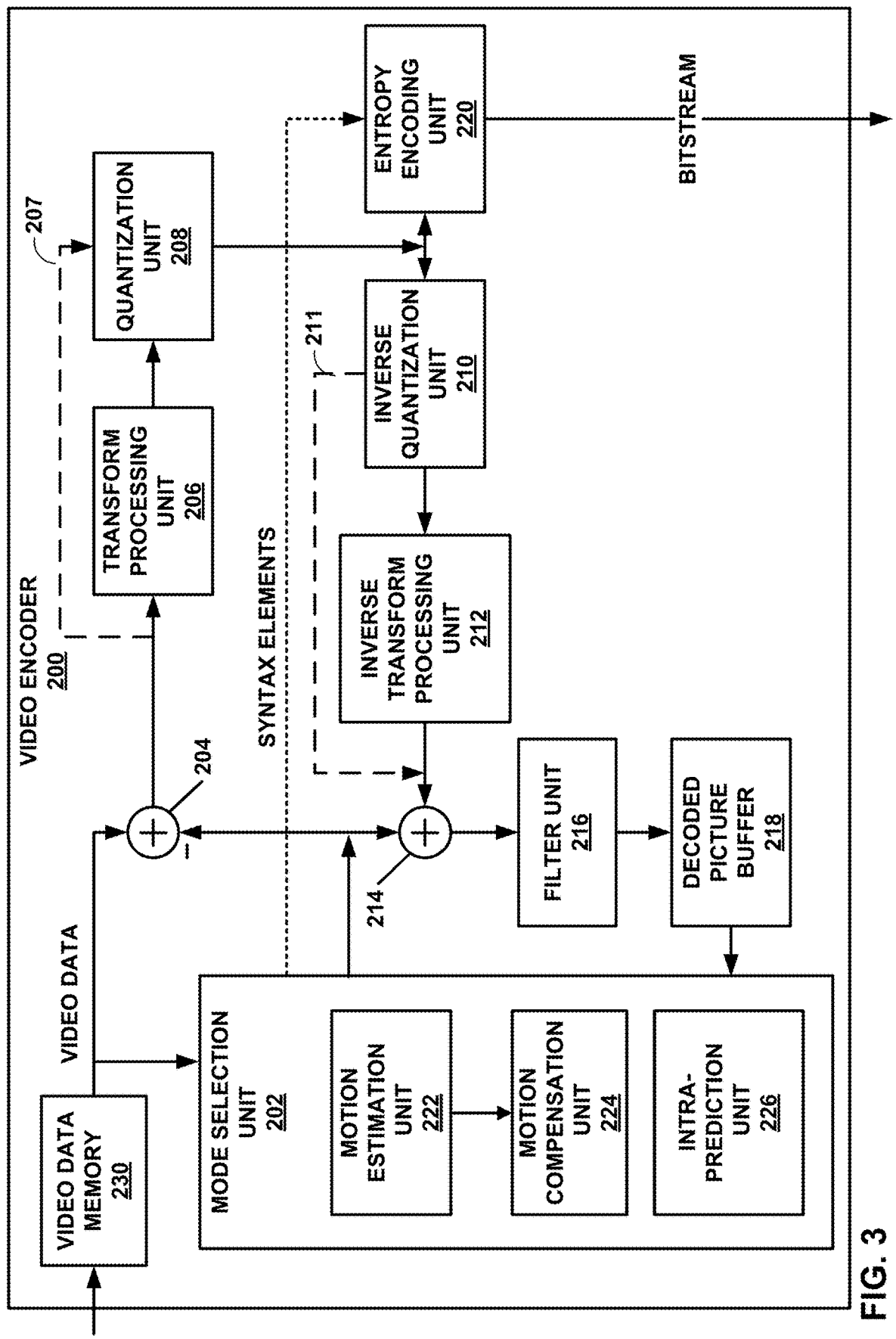
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as when a block is being encoded using transform skip mode, mode selection unit 202 may disable level mapping, which is discussed in more detail below). In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply a transform (or skips the application of a transform) to a residual block, such as when the block is being coded using transform skip mode. This skipping of the application of a transform is represented by dashed line 207.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. In the case of a block encoded using transform skip mode, inverse transform processing unit 212 may skip inverse transforming the block. This skipping of inverse transforming the block is represented by dashed line 211. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

For example, entropy encoding unit 220 may determine whether transform skip mode is used a current block of video data. Based on transform skip mode being used for the current block, entropy encoding unit 220 may disable level mapping for residual coding and encode the current block without applying level mapping.

In some examples, entropy encoding unit 220 may encode a flag indicative of whether a transform coefficient of the current block is non-zero, two flags indicative of whether an absolute value of the transform coefficient is greater than j<<1)+1, and a flag indicative of the parity of the transform coefficient in a first pass. Entropy encoding unit 220 may encode a flag indicative of the sign of the transform coefficient and three flags indicative of whether an absolute value of the transform coefficient is greater than j<<1)+1 in a second pass. Entropy encoding unit 220 may encode a flag indicative of a remaining absolute value of the transform coefficient in a third pass.

In some examples, entropy encoding unit 220 may determine neighboring coefficient values that neighbor a current coefficient value of the current block. Entropy encoding unit 220 may determine a Rice parameter based on the neighboring coefficient values and code the current block further based on the Rice parameter.

In some examples, entropy encoding unit 220 may determine information associated with neighboring coefficients neighboring a current coefficient of the current block. Based on the information associated with the neighboring coefficients, entropy encoding unit 220 may determine a context for the current coefficient and encode the current block further based on the context.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processing units implemented in circuitry coupled to the memory and being configured to determine whether transform skip mode is used for a current block of the video data, based on transform skip mode being used for the current block, disable level mapping for residual coding, and encode the current block without applying level mapping.

Figure 4:
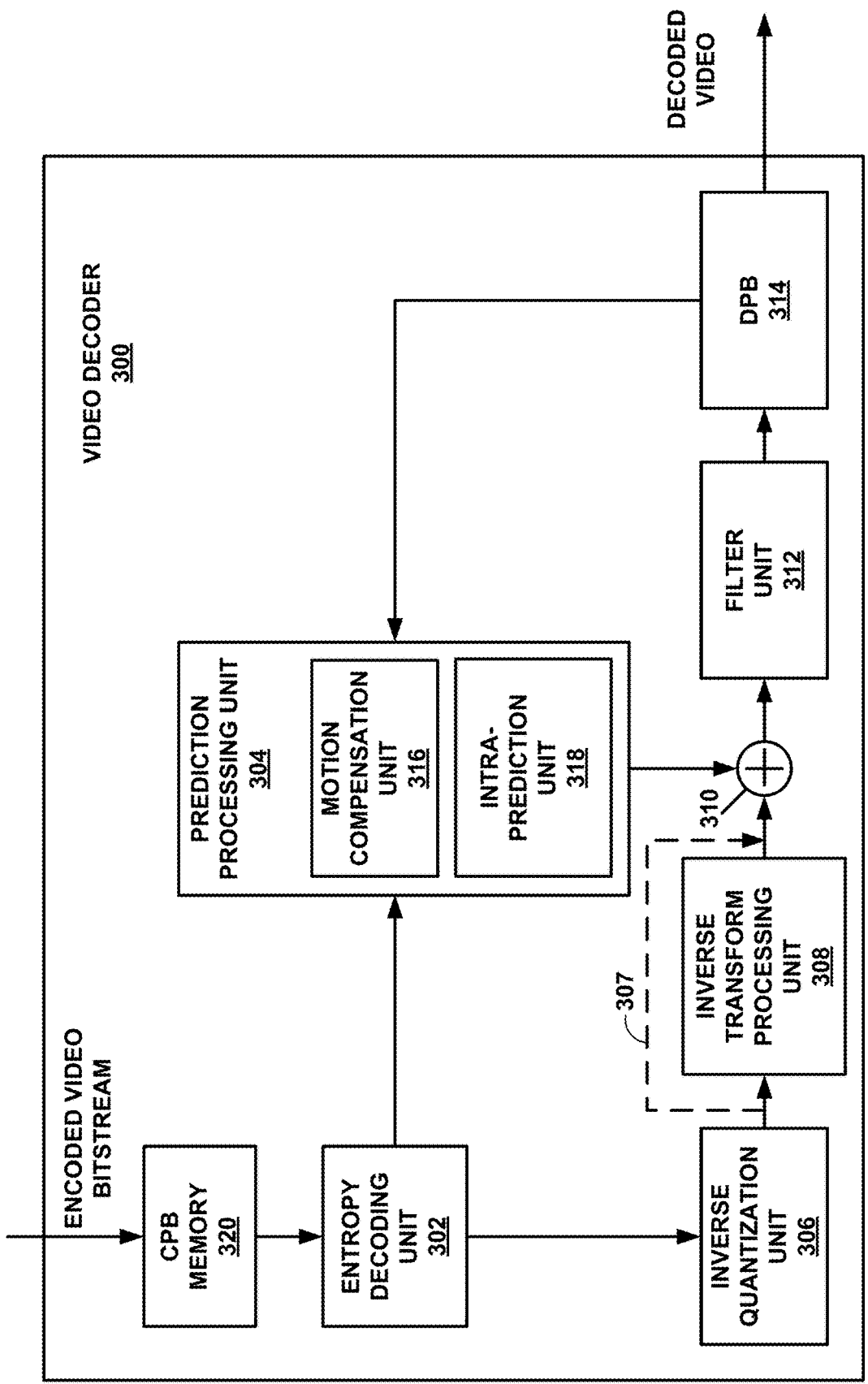
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). In some examples, entropy decoding unit 302 may determine whether transform skip mode is used for a current block of the video data. Based on transform skip mode being used for the current block, entropy decoding unit 302 may disable level mapping for residual coding and video decoder 300 may decode the current block without applying level mapping.

In some examples, entropy decoding unit 302 may decode a flag indicative of whether a transform coefficient of the current block is non-zero, two flags indicative of whether an absolute value of the transform coefficient is greater than $j<<1)+1$, and a flag indicative of the parity of the transform coefficient in a first pass. Entropy decoding unit 302 may decode a flag indicative of the sign of the transform coefficient and three flags indicative of whether an absolute value of the transform coefficient is greater than $j<<1)+1$ in a second pass. Entropy decoding unit 302 may decode a flag indicative of a remaining absolute value of the transform coefficient in a third pass.

In some examples, entropy decoding unit 302 may determine neighboring coefficient values that neighbor a current coefficient value of the current block. Entropy decoding unit 302 may determine a Rice parameter based on the neighboring coefficient values and video decoder 300 may decode the current block further based on the Rice parameter.

In some examples, entropy decoding unit 302 may determine information associated with neighboring coefficients neighboring a current coefficient of the current block. Based on the information associated with the neighboring coefficients, entropy decoding unit 302 may determine a context for the current coefficient and video decoder 300 may decode the current block further based on the context.

Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block. In some examples, when decoding a block using transform skip mode, inverse transform processing unit 308 may not apply (or skips) an inverse transform. This skipping of the inverse transform is represented by dashed line 307.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3). In some examples, such as when decoding a block using transform skip mode, prediction processing unit 304 may disable level mapping.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including memory configured to store the video data, and one or more processors implemented in circuitry and coupled to the memory, the one or more processors being configured to: determine whether transform skip mode is used for a current block of the video data; based on transform skip mode being used for the current block, disable level mapping for residual coding; and decode the current block without applying level mapping.

Video coding may be lossy or may be lossless. Lossy video coding may result in a less accurate reproduction of the original video stream after decoding when compared to lossless video coding. However, lossy video coding may be more bandwidth efficient than lossless video coding. For example, it may be desirable to use lossy video coding in video streaming applications, while it may be desirable to use lossless video coding in medical applications where very accurate reproduction of the original video stream may be desired. In some examples, where there may be a region of interest in a video stream, lossy/lossless techniques may be used. For example, the region of interest may be coded using lossless techniques, while the rest of the video stream may be coded using lossy techniques. In this manner, the region of interest may be very accurately decoded without taking up all the bandwidth that would be used if the entire video stream was encoded using lossless techniques.

As mentioned above, in some video coding standards, one residual coding technique is used for lossy coding and another residual coding technique is used for lossless coding. As such, if a video encoder decides to use a combined lossy/lossless encoding technique, the video encoder may be unable to adapt to the lossy/lossless encoding technique or the performance of the video encoder may decrease because that would require the video encoder to use two different techniques.

In accordance with the techniques of this disclosure, transform skip residual coding techniques may be the same for lossy and lossless coding. These techniques may improve coder performance (e.g., reduce processing power consumption) and/or reduce coding latency.

In VVC Draft 7, a residual block of a transform skip mode coded block may be split into multiple coefficient groups (CGs). The coefficients in transform skip mode may be in the spatial domain rather than the frequency domain, which the coefficients would be if a transform were to be applied. For each CG, video decoder 300 parses (or in some cases, infers) the flag coded_sub_block_flag (also called the CG flag) and if the value of CG flag is 0, then the value of all the coefficients inside the CG are 0. Otherwise, video decoder 300 further decodes the values of coefficients inside the CG.

Figure 5:
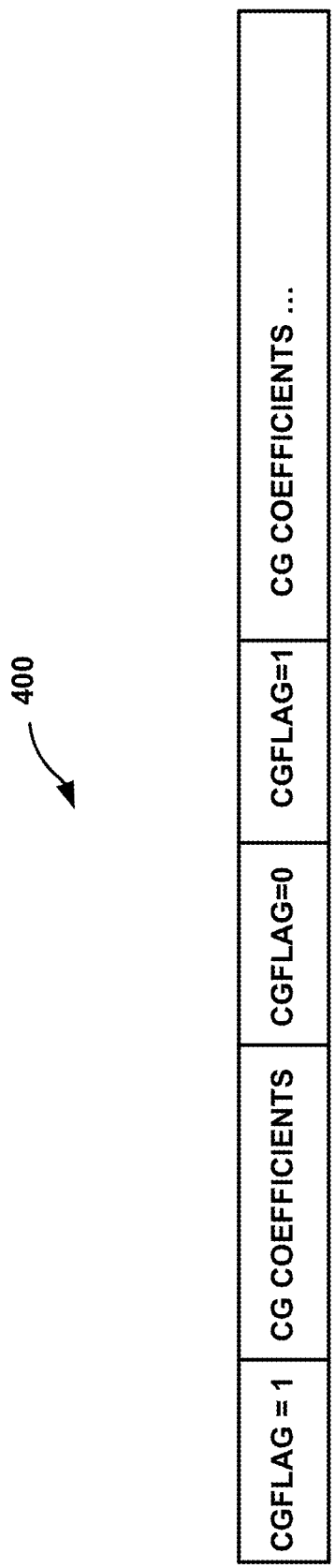
FIG. 5 is a conceptual diagram illustrating the interleaved manner of coding CG flag and coefficients in VVC Draft 7.

FIG. 5 is a conceptual diagram illustrating the interleaved manner of coding CG flags and coefficients in VVC Draft 7. In VVC Draft 7, CG flags and coefficients are coded in an interleaved manner as shown in bitstream 400 of FIG. 5. For example, a first CG flag for a first CG is shown as a 1, indicating that there are non-zero coefficients in the first CG. The first CG flag is followed by the CG coefficients for the first CG. The CG flag for a second CG is shown as a 0. Because the second CG flag is a 0, all the coefficients inside the second CG are 0s and there is no need to signal or parse the individual coefficients of the second CG. So the coefficients for the second CG are not contained in bitstream 400. A CG flag for a third CG is shown as a 1, followed by the coefficients for the third CG.

The scanning order of the coefficients inside a CG of transform skip mode block may be from top-left to the bottom-right. As such, when video decoder 300 decodes a syntax element of one particular coefficient, the same syntax element of the left, top, and top-left neighbors of that particular coefficient have already been decoded.

The order of 3-pass residual coding for transform skip mode in VVC Draft 7 is now discussed. In VVC Draft 7, up to 9 syntax elements may be coded for each coefficient: sig_coeff_flag (which specifies whether a transform coefficient is non-zero), coeff_sign_flag (which specifies the sign of the transform coefficient level), abs_level_gt1_flag (which specifies whether the absolute value of a transform coefficient is greater than (<1)+1), par_level_flag (which specifies the parity of the transform coefficient), abs_level_gtX_flag (X=2, 3, 4, 5) (which specifies whether the absolute value of a transform coefficient is greater than (j<<1)+1, and abs_remainder (which specifies the remaining absolute value of a transform coefficient coded with Golomb-Rice code).

For example, video decoder 300 may decode a coefficient as follows:

absCoeffLevel=sig_coeff_flag+abs_level_gt_flag+
 par_level_flag+2*(abs_level_gt2_flag+
 abs_level_gt3_flag+ . . . +abs_level_gt5_flag)+
 abs_remainder CoeffLevel=(coeff_sign_flag==1?−1:1)*absCoef-
 fLevel where absCoeffLevel is the absolute value of the coefficient level and CoeffLevel is the coefficient level. If a syntax element does not exist in the bitstream, video decoder 300 may infer that element to be 0.

Video decoder 300 may split the decoding of the 9 possible syntax elements into 3 passes. For example, rather than decoding all 9 syntax elements for a given coefficient before moving on to another coefficient, video decoder 300 may decode certain syntax elements for a number of coefficients before decoding other syntax elements for the first coefficient. Video decoder 300 may split the decoding of the 9 possible syntax elements as follows:

$1^{st}$ pass: sig_coeff_flag, coeff_sign_flag, abs_level_gt1_flag and par_level_flag are decoded.

$2^{nd}$ pass: abs_level_gtX_flag (X=2, 3, 4, 5) are decoded.

$3^{rd}$ pass: abs_remainder is decoded.

In the $1^{st}$ and $2^{nd}$ pass, video decoder 300 may code the syntax elements using context coded bins and in the $3^{rd}$ pass, video decoder 300 may code the syntax elements using bypass bins (e.g., equal-probability bins coded by a CABAC engine with no context involved). For each TU, there may be a limit of total context coded bins that can be used. In VVC Draft 7, the limit is set to 1.75*TUSize (e.g., the TU area), where TUSize is a size of the TU in samples. As used herein, "context coded" means context-based entropy coded using a context model or probability model and a "context" means the context model or probability model.

For the $1^{st}$ pass or $2^{nd}$ pass of each coefficient, if there are less than 4 context coded bins remaining for the TU, video decoder 300 may exceed the context coded bin limit for that particular pass. To avoid exceeding the context coded bin limit, after the number of remaining context coded bins is less than 4, video decoder 300 may skip all the subsequent $1^{st}$ and $2^{nd}$ pass coding and may adjust the corresponding abs remainders to include the missing syntax flags. More specifically, for each coefficient:

If both $1^{st}$ pass decoding and $2^{nd}$ pass decoding are performed, then video decoder 300 may adjust the value of abs_remainder (if any) to be absCoeffLevel−10;

If the $1^{st}$ pass decoding is performed but the $2^{nd}$ pass decoding is skipped, then video decoder 300 may adjust the value of abs_remainder (if any) to be absCoeffLevel−2;

If both $1^{st}$ pass decoding and $2^{nd}$ pass decoding are skipped, then video decoder 300 may adjust the value of abs_remainder (if any) to be absCoeffLevel−0.

The number that is subtracted from absCoeffLevel to arrive at abs_remainder is called "base level" of the abs_remainder. Basically, base level is the value that has already been coded in the $1^{st}$ and $2^{nd}$ pass of the coefficient coding.

Rice Parameters are now discussed. As described in the previous section, abs_remainder is coded via Rice-Golomb coding (or Golomb-Rice), one parameter that is used in a Rice-Golomb coding procedure is a "Rice parameter."

The Rice parameter derivation for coding of bypass coded portions of coefficient levels for transform coefficient coding and transform skip residual coding should be designed to address the different local statistics encountered in video coding. When coefficient residuals tend to be large values, large Rice parameter values are needed for efficient representation. When the coefficient residuals tend to be small, smaller Rice parameter values are more preferable.

Rice parameter derivation for transform skip coefficients is now discussed. In VVC Draft 7, the Rice parameter used for transform skip mode is always set to 1. In VVC Draft 6, (See B. Bross et al., "Versatile Video Coding (Draft 6)", Joint Video Experts Team (JVET) of ITU-T SG 16 WP 3 and ISO/IEC JTC 1/SC 29/WG 11, $15^{th}$ Meeting: Gothenburg, SE, Jul. 3-12, 2019, JVET-02001-v14 (hereinafter VVC Draft 6) the Rice parameter for transform skip mode is derived as follows:

Two neighbor coefficients are used to derive the Rice parameter, and since the coefficient scan is in forward direction (from top-left to bottom-right), the template uses neighbors to the left and above to derive the locSumAbs value.

The locSumAbs for a coefficient at position (x,y) is as follows:

locSumAbs=abs(coeff(x−1,y))+abs(coeff(x,y−1))

If a neighbor coefficient does not exist, video decoder 300 may infer the value of the neighbor coefficient to be 0.

Figure 6:
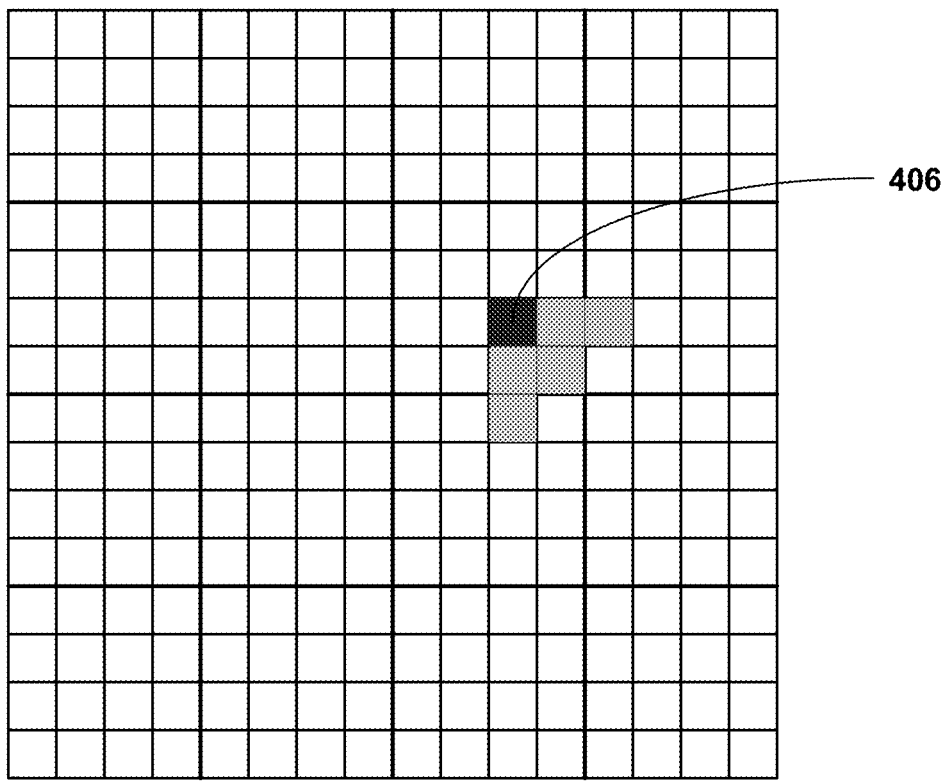
FIG. 6 is a conceptual diagram illustrating a template of neighboring coefficients used for Rice parameter derivation.

The value of locSumAbs will be clipped to min(locSumAbs,31), which is used to derive the Rice parameter using the following:

riceParTable[32]={0,0,0,0,0,0,0,0,0,0,0,0,1,1,1,1,1,1,
 1,1,1,1,1,1,1,2,2,2,2,2,2,2};

Rice parameter derivation for regular transform coefficients is now discussed. FIG. 6 is a conceptual diagram illustrating a template of neighboring coefficients used for Rice parameter derivation. FIG. 6 shows a current coefficient 406 and five gray shaded neighboring coefficients whose levels are used for the Rice parameter derivation. For example, video decoder 300 may determine the locSumAbs for a coefficient at position (x,y) through the following formula:

locSumAbs=abs(coeff(x+1,y))+abs(coeff(x+2,y))+abs
 (coeff(x,y+1))+abs(coeff(x+1,y+1))+abs(coeff(x,
 y+2))

If the coeff(x,y) is outside of a TU, then video decoder 300 may not take those values into account in the locSumAbs computation. The final locSumAbs may be clipped by locSumAbs=max(min(locSumAbs−5*baseLevel,31),
 0);

where baseLevel is the base level that is represented by context coded portion of the coefficient level. The final clipped locSumAbs value is used to perform the table look up from the following table to derive the Rice parameter.

riceParTable[32]={0,0,0,0,0,0,0,0,1,1,1,1,1,1,2,2,2,2,
 2,2,2,2,2,2,2,2,2,3,3,3,3};

Level mapping based residual coding for transform skip mode is now discussed. In VVC Draft 7, level mapping is performed on transform skip residuals. For each coefficient, a predictor is first calculated based on neighboring coefficients (left & top). For example, video encoder 200 or video decoder 300 may calculate the predictor for each coefficient. Video encoder 200 may adjust the absolute value of the current coefficient based on the predictor before encoding. This conversion from coefficient value to adjusted coefficient value is called "level mapping."

Level mapping was introduced based on a few observations. Firstly, coding a large number may require more bits than coding a smaller number. Secondly, if a neighbor has a value of "a", then the current absCoeff has a better chance of also having the same value "a" than another value. Based on these two observations, for each sample, one can find a predicator value "pred. The actual value to be coded "absCoeff" has a good chance of being the value "pred." As such, video encoder 200 may save some bits by the following: if absCoeff=pred,code a 1. Otherwise, code a non-1 value to represent absCoeff because 1 is reserved for the case in which absCoeff=pred, so a video coder may code 1+1=2. If absCoeff is less than pred, the video coder may code absCoeff+1.

Video encoder 200 or video decoder 300 may perform the following operations shown in pseudo code.

Video Encoder 200:

```
pred = min(X0, X1) == 0 ? max(X0, X1) : min(X0, X1);
if (absCoeff == pred)
{
  absCoeffMod = 1;
}
else
{
  absCoeffMod = (absCoeff < pred) ? absCoeff + 1 : absCoeff;
}
Video decoder 300:
  pred = min(X0, X1) == 0 ? max(X0, X1) : min(X0, X1);
  if (absCoeffMod == 1 && pred > 0)
  {
    absCoeff = pred;
  }
  else
  {
    absCoeff = absCoeffMod - (absCoeffMod <= pred);
  }
``` where X0 and X1 denote the absolute coefficient values located to the left and top of the current coefficient, respectively. The value absCoeffMod denotes the absolute coefficient value after level mapping. The value of absCoeff is the encoded/decoded coefficient absolute value. In this disclosure, several techniques related to the residual coding scheme in VVC Draft 7 are disclosed. These techniques may be used separately or in any combination.

The removal of level mapping is now discussed. According to this technique, level mapping for residual coding in the VVC Draft 7 may be disabled for transform skip mode. For example, video encoder 200 and video decoder 300 may not level map during residual coding for transform skip mode. Disabling level mapping in transform skip mode may decrease processing power consumption and may improve latency.

An alternative 3-pass residual coding technique is now discussed. In this technique, the 3-pass encoding and decoding for transform skip residual coding of VVC Draft 7 is modified in the following manner:

In the 1st pass, sig_coeff_flag, abs_level_gt1_flag, abs_level_gt2_flag and par_level_flag are coded.
In the $2^{nd}$ pass, coeff_sign_flag and abs_level_gtX_flags (X3, 4, 5) are coded.
In the $3^{rd}$ pass, abs_remainder is coded.
Using the above 3-pass encoding and decoding scheme, abs_level_gt2_flag is more likely to be coded via CABAC context (as opposed to by-pass coding) than in the 3 pass scheme of VVC Draft 7. Coding abs_level_gt2_flag via CABAC context may be desired, for example, when abs_level_gt2_flag is statistically more important than coef_f_sign_flag.

Rice parameter derivation techniques are now discussed. As described in this disclosure, the following techniques may be used to derive Rice parameters.

In one example, video decoder 300 may use neighboring coefficient values to derive Rice parameters. In another example, video decoder 300 may use a number of available neighboring coefficients when deriving Rice parameters. In some examples, available neighboring coefficients may be coefficients that neighbor a current coefficient which have already been determined. For example, the left neighbor of a coefficient that is located on the left boundary of a TU may be considered as unavailable and video decoder 300 may not use the unavailable coefficient when deriving the Rice parameters. In some examples, video decoder 300 may use a value of the base level when deriving Rice parameters. Deriving Rice parameters as discussed herein, may decrease processing power consumption and improve latency.

A few further examples of the above examples are listed below, and any of these examples may be used alone or in any combination.

Figure 7:
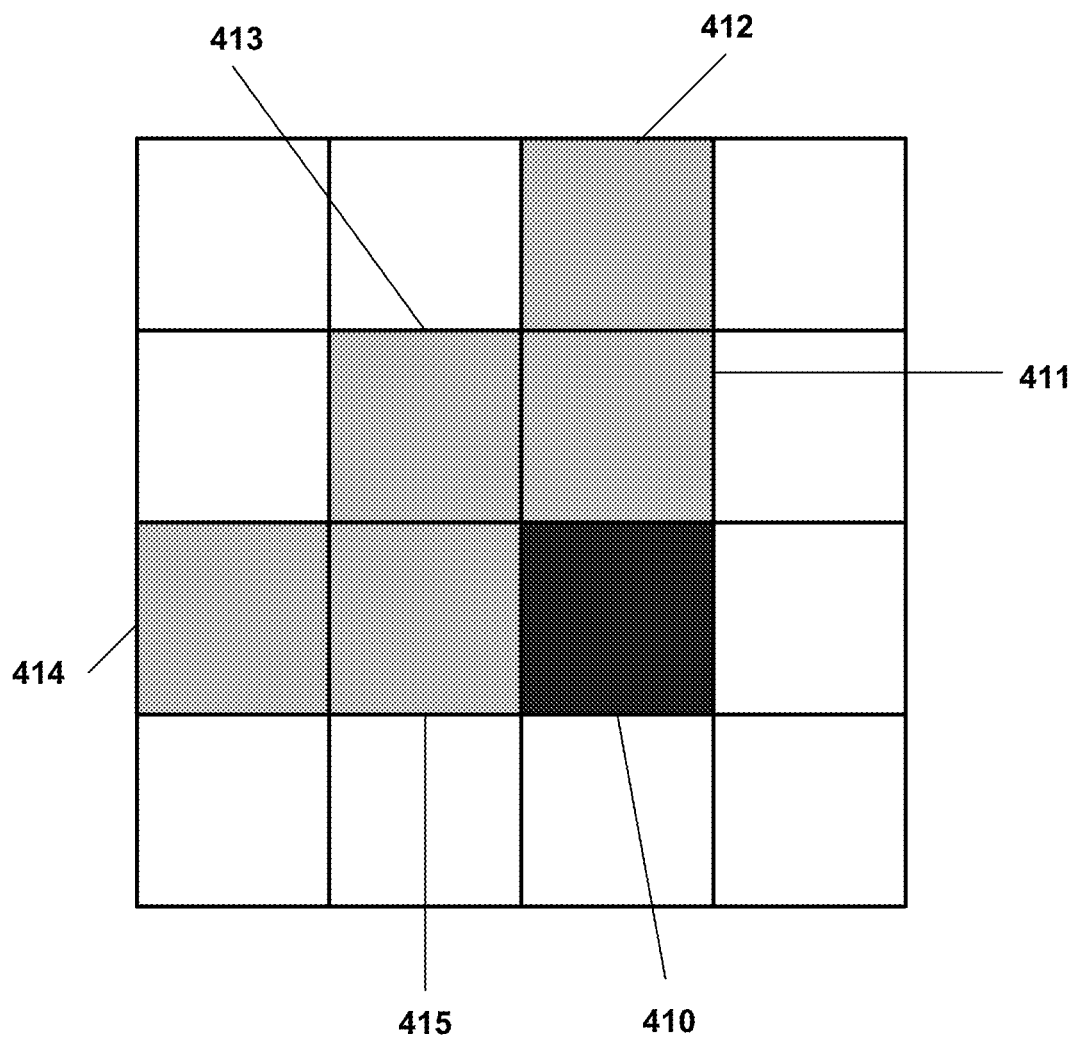
FIG. 7 is a conceptual diagram illustrating an example local template of 5 neighboring coefficients.

FIG. 7 is a conceptual diagram illustrating an example local template of 5 neighboring coefficients. In some examples, video decoder 300 may use a local template of 5 neighboring coefficients to derive the Rice parameter. As shown in FIG. 7, block 410 (shaded black) indicates the current coefficient and the neighboring coefficients 411-415 (shaded gray) indicate the positions of the 5 coefficients in the local template.

To derive the Rice parameter, video decoder 300 may determine the value locSumAbs as follows:

locSumAbs=abs(coeff($x$-1,$y$))+abs(coeff($x$-2,$y$))+abs(coeff($x$,$y$-1))+abs(coeff($x$-1,$y$-1))+abs(coeff($x$,$y$-2)), where abs(coeff(x,y)) denotes the absolute value of the coefficient located at (x,y). If coeff(x,y) does not exist, video decoder 300 may infer the value of coeff(x,y) to be 0.

Video decoder 300 may derive the Rice parameter (cRiceParam) as follows:

cRiceParam=riceParTable[min(31,locSumAbs)]+(locSumAbs>128?1:0)

where the riceParTable is defined as:

riceParTable={0,0,0,0,0,0,0,1,1,1,1,1,1,2,2,2,2,2,2, 2,2,2,2,2,2,2,3,3,3,3};

In another example, after the value of locSumAbs is calculated as described above, video decoder 300 may derive the Rice parameter (cRiceParam) as follows:

cRiceParam=riceParTable[min(31,locSumAbs)]+(locSumAbs>256?2:localSumAbs>128?1:0)

where riceParTable is as defined above.

In another example, after video decoder 300 calculates the value of locSumAbs as described above, video decoder 300 may normalize locSumAbs as follows: locSumAbs= (noPos==0||noPos==5) ? locSumAbs:((5*locSumAbs)>> (noPos>>1)), where noPos denotes the number of available neighboring coefficients within the local template. Video decoder 300 may derive the Rice parameter (cRiceParam) using locSumAbs as in index of a look-up table: cRiceParam=riceParTable[min(31, locSumAbs)], where riceParTable is defined as discussed above.

In another example, video decoder 300 may derive the Rice parameter as discussed above, except that a different example of normalization is used as follows:

$$locSumAbs = locSumAbs << ((5-noPos) >> 1)$$

In another example, video decoder 300 may derive the value locSumAbs as described above and may derive the Rice parameter based on locSumAbs and the base level of the residual (baseLevel) as follows:

$$offset = baseLevel == 10 ? -30 : -20$$

$$cRiceParam = riceParTable[max(min(31, locSumAbs + offset), 0)]$$

In another example, video decoder 300 may derive the value locSumAbs in the same manner as described above. Video decoder 300 may derive the Rice parameter based on locSumAbs and the base level of the residual (baseLevel) as follows:

$$cRiceParam = riceParTable[max(min(31, locSumAbs - (baseLevel >> 2)*15), 0)]$$

In another example, video decoder 300 may derive the value of locSumAbs in the same manner described above. Video decoder 300 may derive the Rice parameter based on locSumAbs and the base level of the residual (baseLevel) as follows:

$$locSumAbs = baseLevel == 10 ? locSumAbs : locSumAbs/2 - 4$$

$$cRiceParam = riceParTable[min(locSumAbs, 0)]$$

In another example, after video decoder 300 calculates the value of locSumAbs as described above, video decoder 300 may derive the Rice parameter (cRiceParam) as follows:

```
offset = baseLevel == 10 ? -30 : -20
if (baseLevel == 0)
   riceOffset = (locSumAbs > 256 ? 2 : localSumAbs > 128 ? 1 : 0)
else
   riceOffset = (locSumAbs > 256 ? 1 : 0)
cRiceParam = riceParTable[max( min( 31, locSumAbs + offset), 0)] +
riceOffset
``` where riceParTable is defined as discussed above.

In an example, after video decoder 300 calculates the value of locSumAbs as described above, video decoder 300 may derive the Rice parameter (cRiceParam) as follows:

$$offset = baseLevel == 10 ? -30 : -20$$

$$riceOffset = (locSumAbs > 128 ? 1 : 0)$$

$$cRiceParam = riceParTable[max(min(31, locSumAbs + offset), 0)] + riceOffset$$

where riceParTable defined as discussed above.

In this example, video decoder 300 may calculate locSumAbs as described above, and video decoder 300 may normalize the value of locSumAbs as follows:

$$locSumAbs = locSumAbs < ((5-noPos) >> 1)$$

where noPos denotes the number of available neighboring coefficients within the local template. Video decoder 300 may derive the Rice parameter based on locSumAbs and the base level of the residual (baseLevel) as follows:

$$offset = baseLevel == 10 ? -30 : -20$$

$$cRiceParam = riceParTable[max(min(31, locSumAbs + offset), 0)]$$

In another example, video decoder 300 may calculate locSumAbs as described above, and video decoder 300 may normalize the value of locSumAbs as follows:

$$locSumAbs = locSumAbs < ((5-noPos) >> 1)$$

where noPos denotes the number of available neighboring coefficients within the local template. Video decoder 300 may derive the Rice parameter based on locSumAbs and the base level of the residual (baseLevel) as follows:

$$cRiceParam = riceParTable[max(min(31, locSumAbs - (baseLevel >> 2)*15), 0)]$$

In another example, video decoder 300 may calculate locSumAbs as described above, and video decoder 300 may normalize the value of locSumAbs as follows:

$$locSumAbs = locSumAbs < ((5-noPos) >> 1)$$

where noPos denotes the number of available neighboring coefficients within the local template. The Rice parameter is derived based on locSumAbs and the base level of the residual (baseLevel) as follows:

$$offset = baseLevel > 0 ? -20 : 0$$

$$cRiceParam = riceParTable[max(min(31, locSumAbs + offset), 0)]$$

Figure 8:
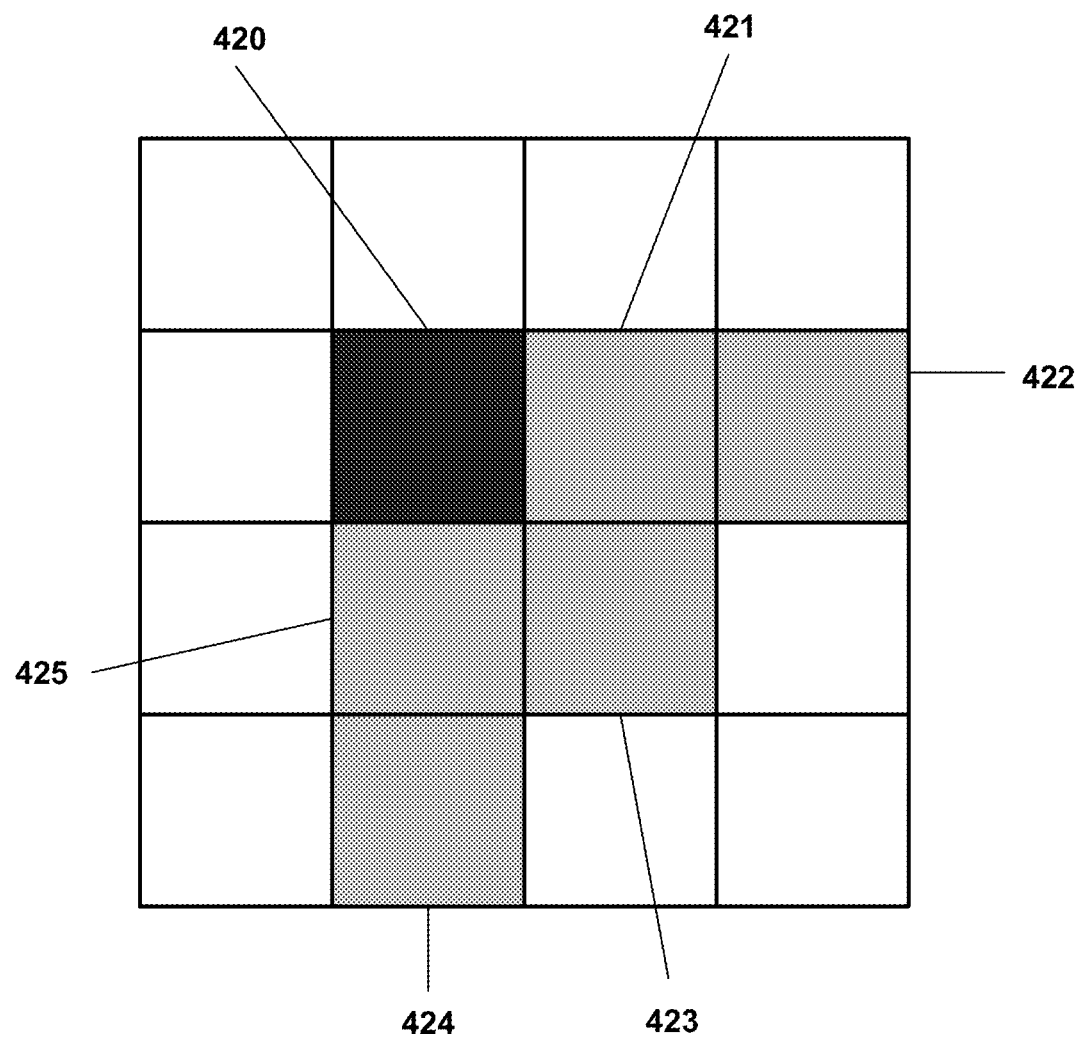
FIG. 8 is a conceptual diagram illustrating another example local template of 5 neighboring coefficients.

FIG. 8 is a conceptual diagram illustrating an example local template of 5 neighboring coefficients. The examples discussed above use a local template that contains coefficients on the left, top, and top-left side of the current coefficients as shown in FIG. 7. The techniques of this disclosure may be modified to use different neighbors. For example, if the scanning order of coefficient coding is from bottom-right to top-left, video decoder 300 may use the template that includes right, bottom and bottom-right neighbors in each of the examples described above as shown in FIG. 8, where block 420 (shaded black) represents the current coefficient and neighboring coefficients 421-425 (shaded gray) represent the neighboring coefficients in the template.

Context derivation for syntax elements is now discussed. In some examples, video decoder 300 may use the information of neighboring coefficients to derive the context(s) used for the current coefficient. For example, the information of neighboring coefficients may include the neighboring syntax value(s), the number of available neighboring coefficients, etc. Using information of neighboring coefficients may decrease processing power consumption and may improve latency.

In some examples, video decoder 300 may selectively share the contexts used for residual coding between luma and chroma components. For example, for some syntax elements of residual coding, luma and chroma components share a same set of contexts while for other syntax elements, luma and chroma use different sets of contexts.

In some examples, for each of the syntax element to which the techniques of this disclosure are applied, video decoder 300 may select the context out of 5 candidates (e.g., denoted as context 0, 1, 2, 3 and 4 in Table 1 below). The selection of the contexts may be based on neighboring syntax values (e.g., left, top and top-left neighbor). For example, top_flag may be the value of the same syntax element of the top neighbor coefficient (e.g., neighboring coefficient 411 in FIG. 7), left_flag may be the value of the same syntax element of the left neighbor coefficient (e.g., neighboring coefficient 415 in FIG. 7) and top_left_flag may be the value of the same syntax element of the top-left neighbor coefficient (e.g., neighboring coefficient 413 in FIG. 7). If a neighboring coefficient does not exist, video decoder 300 may infer the corresponding flag to be 0. For example, noPos may be the number of available neighboring coefficients. Video decoder 300 may derive the context as follows:

```
if noPos == 0
  selectedContext = 0
else
``` the value of selectedContext (e.g., context used) is assigned according to Table 1.

TABLE 1

Context derivation when noPos > 0

| top_flag | left_flag | top-left flag | context used |
|---|---|---|---|
| 0 | 0 | 0 | 1 |
| 0 | 0 | 1 | 1 |
| 0 | 1 | 0 | 2 |
| 0 | 1 | 1 | 4 |
| 1 | 0 | 0 | 2 |
| 1 | 0 | 1 | 4 |
| 1 | 1 | 0 | 3 |
| 1 | 1 | 1 | 3 |

The technique above may be applied to different syntax elements. For example, video decoder 300 may select sig_coeff_flag, abs_level_gt1_flag and/or abs_level_gt2_flag using the technique.

The context 0, 1, 2, 3, 4 in the description above is one example way of naming different contexts. A different way of naming the contexts may be used and still be within the scope of this disclosure.

In some examples, for each of the syntax elements to which the techniques of this disclosure are applied, video decoder 300 may select the context to be used out of 4 candidates (e.g., denoted as context 0, 1, 2 and 3) rather than 5 candidates. Video decoder 300 may base the selection of the context on neighboring syntax values (left, top and top-left neighbor). For example, top_flag may be the value of the same syntax element of the top neighbor coefficient (e.g., neighboring coefficient 411), left_flag may be the value of the same syntax element of the left neighbor coefficient (e.g., neighboring coefficient 415) and top_left flag may be the value of the same syntax element of the top-left neighbor coefficient (e.g., neighboring coefficient 413). If a neighboring coefficient does not exist, video decoder 300 may infer the corresponding flag to be 0. Video decoder 300 may determine the value of selectedContext (e.g., "context used") according to Table 2.

TABLE 2

Context derivation

| top_flag | left_flag | top-left flag | context used |
|---|---|---|---|
| 0 | 0 | 0 | 0 |
| 0 | 0 | 1 | 0 |
| 0 | 1 | 0 | 1 |
| 0 | 1 | 1 | 3 |
| 1 | 0 | 0 | 1 |
| 1 | 0 | 1 | 3 |
| 1 | 1 | 0 | 2 |
| 1 | 1 | 1 | 2 |

These techniques may be applied to different syntax elements. For example, sig_coeff_flag, abs_level_gt1_flag and abs_level_gt2_flag may be determined according to these techniques.

The context 0, 1, 2, 3 in the description above is one example way of naming different contexts. A different way of naming the contexts may be used and still be within the scope of this disclosure.

In some examples, for each of the syntax elements to which the techniques of this disclosure are applied, video decoder 300 may select the context to be used out of 4 candidates (e.g., denoted as context 0, 1, 2 and 3). Video decoder 300 may base the selection of the contexts on neighboring syntax values (left, top and top-left neighbor). For example, top_flag be the value of the same syntax element of the top neighbor coefficient (e.g., neighboring coefficient 411), left_flag be the value of the same syntax element of the left neighbor coefficient (e.g., neighboring coefficient 415) and top_left flag the value of the same syntax element of the top-left neighbor coefficient (e.g., neighboring coefficient 413). If a neighboring coefficient does not exist, video decoder 300 may infer the corresponding flag to be 0.

For example, noPos may be the number of available neighboring coefficients. Video decoder 300 may perform the context derivation as follows, when noPos==0, one of the predefined context N is assigned, as an example, N=2.

```
if noPos == 0
  selectedContext = N
else
```

Video decoder 300 may determine the value of selectedContext (e.g., "context used") according to Table 3.

TABLE 3

Context derivation

| top_flag | left_flag | top-left flag | context used |
|---|---|---|---|
| 0 | 0 | 0 | 0 |
| 0 | 0 | 1 | 0 |
| 0 | 1 | 0 | 1 |
| 0 | 1 | 1 | 3 |
| 1 | 0 | 0 | 1 |
| 1 | 0 | 1 | 3 |
| 1 | 1 | 0 | 2 |
| 1 | 1 | 1 | 2 |

The techniques may be applied to different syntax elements. For example, video decoder 300 may select sig_coeff_flag, abs_level_gt1_flag and abs_level_gt2_flag using these techniques.

The context 0, 1, 2, 3 in the description above is one example way of naming different contexts. A different way of naming the contexts may be used and still be within the scope of this disclosure.

The techniques described above may be modified to use different neighbors. For example, if the scanning order of coefficient coding is from bottom-right to top-left, the video decoder 300 may use right, bottom and bottom-right neighbors (neighboring coefficients 421, 425 and 423 of FIG. 8, respectively) instead of left, top and top-left neighbors.

In some examples, for sig_coeff_flag, abs_level_gt1 and flag abs_level_gt2_flag of transform skip residuals, video decoder 300 may use separate or different contexts for luma and chroma components. For other syntax elements, luma and chroma components may share a same set of contexts.

In some examples, for each of the 3 syntax elements: sig_coeff_flag, abs_level_gt1 and flag abs_level_gt2_flag, video decoder 300 may use 4 contexts for luma and 4 contexts for chroma. For each specific coefficient, video decoder 300 may select the context as described herein from the 4 contexts for the corresponding color component.

Conditional skipping of second pass is now described. In some examples, video decoder 300 may conditionally skip one or more coding passes based on the information of remaining coefficient groups (CGs) inside the transform unit (TU). As an example, the $2^{nd}$ pass of transform skip coding in VVC Draft 7 may be skipped based on the remaining CG information.

In some examples, numRemNonZeroCGs may be the number of remaining non-zero CGs in the TU (the current CG can be either included or not included in numRemNonZeroCGs). numFlagsPass2 may be the number of flags to be coded in the $2^{nd}$ pass (For example, in VVC Draft 7, numFlagPass2=4). remainingCtxBin may be the remained context coded bins for the current TU. n may be a multiplier, as an example, n=1.75.

CGSize may be the size of a coefficient group. For example, in VVC Draft 7, the value of CGSize is 16.

In some examples, in addition to the other conditions that are needed to perform the $2^{nd}$ pass coding (if any), the following condition may need to be "true" for the $2^{nd}$ pass coding to be performed. According to the techniques of this disclosure, in some examples, the ">" in the condition below may be replaced with ">=".

remainingCtxBin>(n*CGSize*numRemNonZeroCGs)

In some examples, the condition for video decoder 300 to perform the $2^{nd}$ pass coding is:
if (remainingCtxBin>=numFlagsPass2 && remainingCtxBin>(n*CGSize*numRemNonZeroCGs))
Do second pass In some examples, video decoder 300 may obtain the value of numRemNonZeroCGs for each coefficient. Video encoder 200 may code coded_sub_block_flags of all CGs within a TU at the beginning of the TU, in front of coding any specific coefficient within the same TU.

In some examples, numRemCGs may be the number of remaining CGs in the TU (the current CG can be either included or not included in numRemCGs). numFlagsPass2 may be the number of flags to be coded in the 2nd pass (for example, in VVC Draft 7, numFlagPass2=4). remainingCtxBin may be the remaining context coded bins for the current TU. n may be a multiplier, as an example, n=1.75. CGSize is the size of a coefficient group. For example, in VVC Draft 7, the value is 16.

In addition to all other conditions that are needed to perform the 2nd pass coding (if any), the following condition may need to be "true" for video decoder 300 to perform the 2nd pass coding. In some examples, according to the techniques of this disclosure, the ">" in the condition may be replaced with ">=."

remainingCtxBin>(n*CGSize*numRemCGs)

Figure 9:
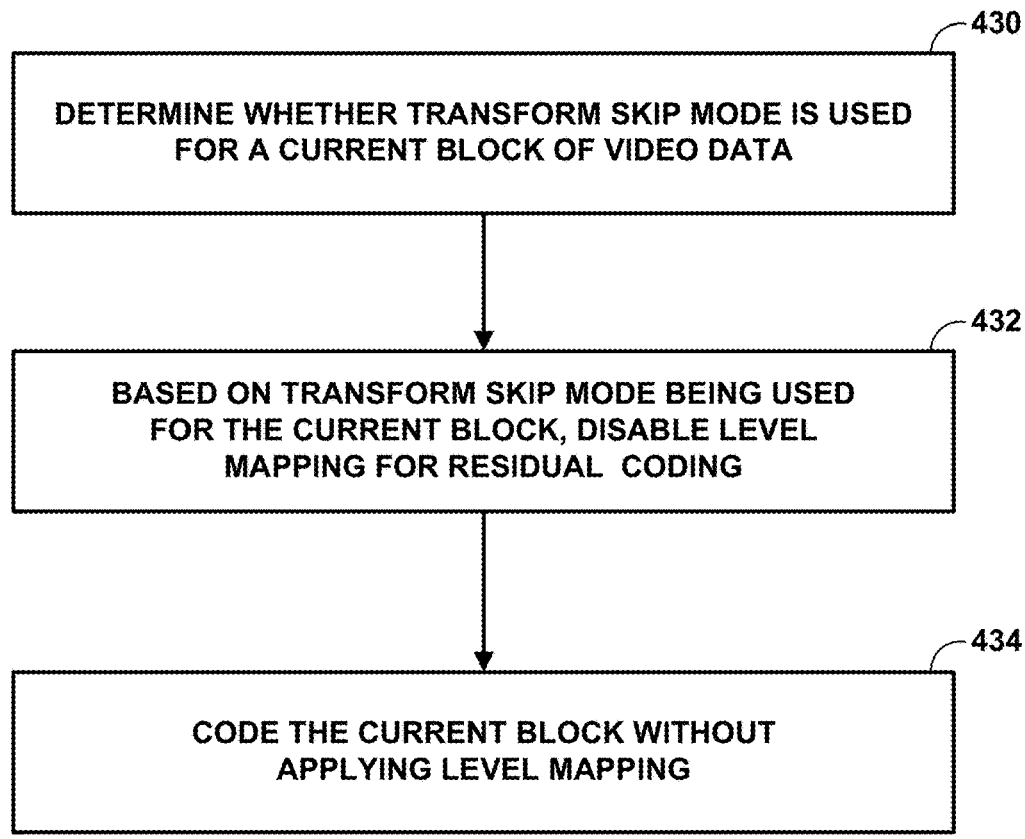
FIG. 9 is a flowchart illustrating example transform skip mode coding techniques of this disclosure.

For example, the condition for video decoder 300 to perform the $2^{nd}$ pass coding may be:
if (remainingCtxBin>=numFlagsPass2 && remainingCtxBin>n*CGSize*numRemCGs)
Do second pass FIG. 9 is a flowchart illustrating example transform skip mode coding techniques of this disclosure. Video encoder 200 or video decoder 300 may determine whether transform skip mode is used for a current block of the video data (430). For example, mode selection unit 202 of video encoder 200 may run multiple encoding passes testing different encoding parameters and determine that the current block should be encoded using transform skip mode based on resulting rate-distortion values. Video encoder 200 may signal a flag indicating the transform skip mode is being used for the current block. Video decoder 300 may parse the flag to determine that the current block is encoded using transform skip mode.

Based on transform skip mode being used for the current block, video encoder 200 or video decoder 300 may disable level mapping for residual coding (432). For example, video encoder 200 or video decoder 300 may not apply level mapping to the residual coefficients of the current block. Video encoder 200 or video decoder 300 may code the current block without applying level mapping. For example, video encoder 200 may refrain from applying level mapping to the residual coefficients and encode the current block using the transform skip mode. For example, video decoder 300 may refrain from applying level mapping to the residual coefficients and may decode the current block using the transform skip mode.

In some examples, video encoder 200 or video decoder 300 may code a flag indicative of whether a transform coefficient of the current block is non-zero, two flags indicative of whether an absolute value of the transform coefficient is greater than j>>1)+1, and a flag indicative of the parity of the transform coefficient in a first pass. Video encoder 200 or video decoder 300 may code a flag indicative of the sign of the transform coefficient and three flags indicative of whether the absolute value of the transform coefficient is greater than j<<1)+1 in a second pass. Video encoder 200 or video decoder 300 may code a flag indicative of a remaining absolute value of the transform coefficient in a third pass, where j is indicative of a number of a flag. For example, j indicates the jth flag indicative of the absolute value of the transform coefficient.

In some examples, video encoder 200 or video decoder 300 may determine neighboring coefficient values that neighbor a current coefficient value of the current block and determine a Rice parameter based on the neighboring coefficient values. For example, video encoder 200 or video decoder 300 may code the current block further based on the Rice parameter. In some examples, the neighboring coefficient values include two left coefficient values, two above coefficient values and an above-left coefficient value. In some examples, the neighboring coefficient values include two right coefficient values, two below coefficient values and a below-right coefficient value.

Video encoder 200 or video decoder 300 may determine information associated with neighboring coefficients neighboring a current coefficient of a current block of video data, and based on the information associated with the neighboring coefficients, determine a context for the current coefficient. In some examples, video encoder 200 or video decoder 300 may code the current block further based on the context. In some examples, the information includes a syntax value for the neighboring coefficient. In some examples, the information includes a number of available neighboring coefficients.

In some examples, video encoder 200 or video decoder 300 may determine a syntax element related to residual coding for the current block and determine a set of contexts for luma components and a set of contexts for chroma components for the current block. In some examples, video encoder 200 or video decoder 300 may code the current block further based on the set of contexts for luma components and the set of context for chroma components. In some examples, if the syntax element is a first syntax element, the set of contexts for luma components and the set of contexts for chroma components is shared. In other words, video encoder 200 or video decoder 300 may use a same set of contexts for both the luma components and the chroma components of the current block if the syntax element is the first syntax element. In some examples, if the syntax element is a second syntax element, the set of context for the luma components and the set of contexts for chroma components are different. In other words, video encoder 200 or video decoder 300 may use a different set of contexts for the luma components than for the chroma components of the current block if the syntax element is the second syntax element.

In some examples, video encoder 200 or video decoder 300 may determine whether a number of remaining context coded bins for a current transform unit is greater than a multiplier multiplied by a size of a coding group multiplied by a number of remaining coefficient groups in the transform unit and based on the number of remaining context coded bins for a current transform unit not being greater than a multiplier multiplied by a size of a coding group multiplied by a number of remaining coefficient groups in the transform unit, skipping a coding pass while coding the current block. In some examples, the multiplier may be 1.75. In some examples, skip a coding pass includes skip a second coding pass.

In some examples, video encoder 200 includes a camera, the camera being configured to capture the video data. In some examples, video decoder 300 includes a display device, the display device being configured to display the video data. In some examples, video encoder 200 or video decoder 300 are part of a mobile phone. In some examples, determining whether transform skip mode is used for a current block of the video data is based on video data from an encoded video bitstream, and coding the current block without applying level mapping comprises decoding the current block without level mapping. In some examples, determining whether transform skip mode is used for a current block of the video data is based on a rate-distortion value, and coding the current block without applying level mapping comprises encoding the current block without level mapping.

Figure 10:
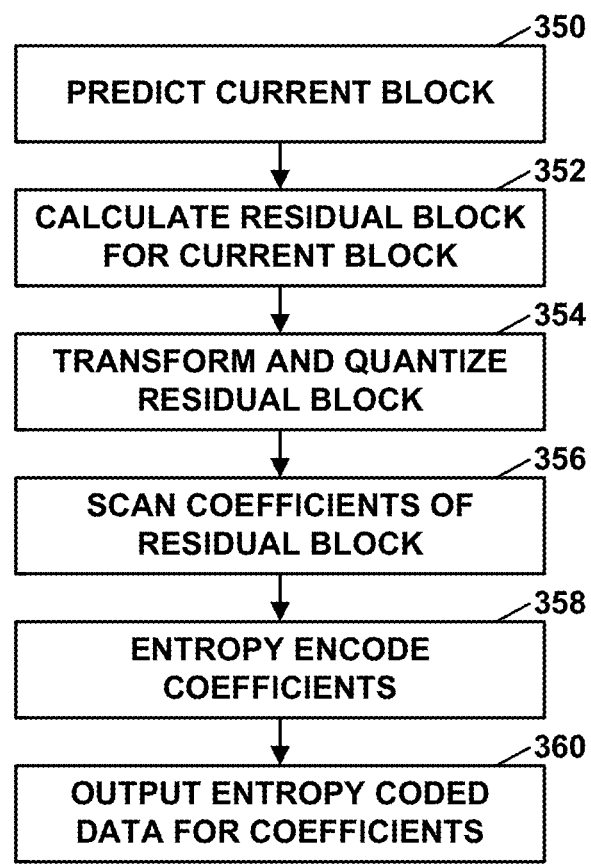
FIG. 10 is a flowchart illustrating a method of encoding video data.

FIG. 10 is a flowchart illustrating an example method for encoding a current block. The current block may comprise a current CU. Although described with respect to video encoder 200 (FIGS. 1 and 3), it should be understood that other devices may be configured to perform a method similar to that of FIG. 10.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. In some examples, when in transform skip mode, video encoder 200 may disable level mapping for coefficient coding. Video encoder 200 may then transform the residual block and quantize transform coefficients of the residual block (354). In some examples, when in transform skip mode, video encoder 200 may not transform the residual block. Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. In some examples, video encoder 200 may determine whether transform skip mode is used for a current block of the video data. Based on transform skip mode being used for the current block, video encoder 200 may disable level mapping for residual coding and code the current block without applying level mapping. Video encoder 200 may then output the entropy encoded data of the block (360).

Figure 11:
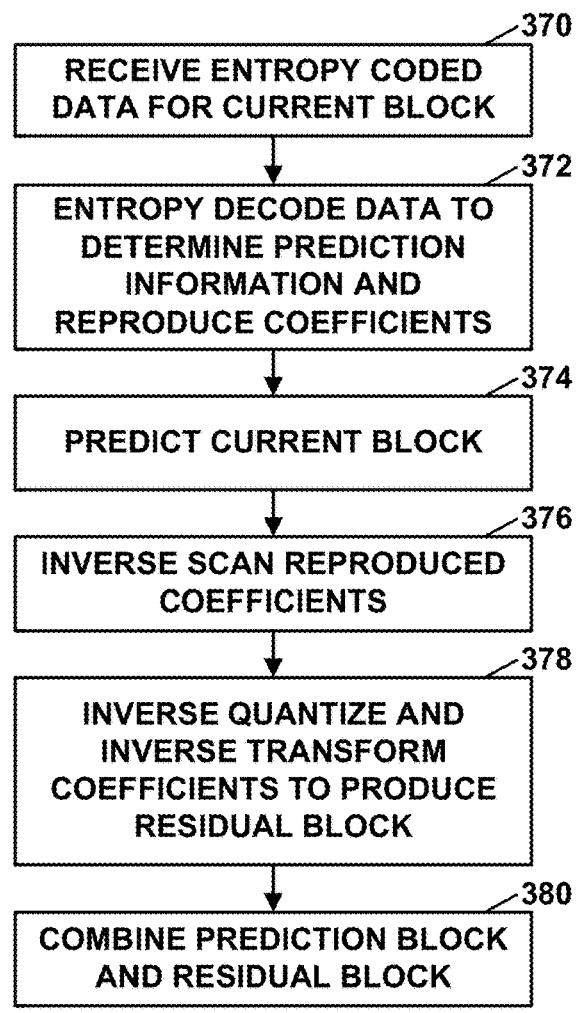
FIG. 11 is a flowchart illustrating a method of decoding video data.

FIG. 11 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 11.

Video decoder 300 may receive entropy encoded data for the current block, such as entropy encoded prediction information and entropy encoded data for coefficients of a residual block corresponding to the current block (370). Video decoder 300 may entropy decode the entropy encoded data to determine prediction information for the current block and to reproduce coefficients of the residual block (372). In some examples, video decoder 300 may determine whether transform skip mode is used for a current block of the video data. Based on transform skip mode being used for the current block, video decoder 300 may disable level mapping for residual coding and decode the current block without applying level mapping. Video decoder 300 may predict the current block (374), e.g., using an intra- or inter-prediction mode as indicated by the prediction information for the current block, to calculate a prediction block for the current block. Video decoder 300 may then inverse scan the reproduced coefficients (376), to create a block of quantized transform coefficients. Video decoder 300 may then inverse quantize and inverse transform the transform coefficients to produce a residual block (378). In some examples, when in transform skip mode, video decoder 300 may skip or not apply the inverse transform. Video decoder 300 may ultimately decode the current block by combining the prediction block and the residual block (380). In some examples, when in transform skip mode, video decoder may disable level mapping for coefficient coding.

By harmonizing transform skip residual coding techniques, according to this disclosure, for lossy and lossless coding, coder performance may be improved, and coding latency may be reduced.

This disclosure includes the following examples.

Clause 1. A method of coding video data, the method comprising:
determining whether transform skip mode is used for a current block of the video data; based on transform skip mode being used, disabling level mapping for residual coding; and coding the current block based on the coefficient coding.

Clause 2. A method of coding video data, the method comprising: coding sig_coeff_flag, abs_level_gt1_flag, abs_level_gt2_flag and par_level_flag for a current block of the video data in a first pass; coding coeff_sign_flag and abs_level_gtX_flags (X=3, 4, 5) of the current block in a second pass; and coding abs_remainder in a third pass.

Clause 3. A method of coding video data, the method comprising: determining neighboring coefficient values that neighbor a current coefficient value of a current block of video data; determining Rice parameters based on the neighboring coefficient values; and coding the current block based on the Rice parameters.

Clause 4. The method of clause 3, wherein the neighboring coefficient values comprise two left coefficient values, two above coefficient values and an above-left coefficient value.

Clause 5. The method of clause 3, wherein the neighboring coefficient values comprise two right coefficient values, two below coefficient values and a below-right coefficient value.

Clause 6. A method of coding video data, the method comprising: determining information associated with neighboring coefficients neighboring a current coefficient of a current block of video data; based on the information associated with the neighboring coefficients, determining a context for the current coefficient; and coding the current block based on the context.

Clause 7. The method of clause 6, wherein the information comprises a neighboring syntax value.

Clause 8. The method of clause 6, wherein the information comprises a number of available neighboring coefficients.

Clause 9. A method of coding video data, the method comprising: determining a syntax element of residual coding for a current block of video data; and determining a set of contexts for luma components and a set of contexts for chroma components for the current block; and coding the current block based on the set of contexts for luma components and the set of context for chroma components, wherein if the syntax element is a first syntax element, the set of contexts for luma components and the set of contexts for chroma components are the same, and if the syntax element is a second syntax element, the set of contexts for the luma components and the set of contexts for chroma components are different.

Clause 10. A method of coding video data, the method comprising: determining information associated with a remained coefficient group inside a transform unit of a current block of the video data; and based on the information, skipping a coding pass while coding the current block.

Clause 11. The method of clause 10, wherein skipping a coding pass comprises skipping a second coding pass.

Clause 12. The method of any of clauses 1-11, wherein coding comprises decoding.

Clause 13. The method of any of clauses 1-12, wherein coding comprises encoding.

Clause 14. The method of any combination of clauses 1-13.

Clause 15. A device for coding video data, the device comprising one or more means for performing the method of any of clauses 1-14.

Clause 16. The device of clause 15, wherein the one or more means comprise one or more processors implemented in circuitry.

Clause 17. The device of any of clauses 15 and 16, further comprising a memory to store the video data.

Clause 18. The device of any of clauses 15-17, further comprising a display configured to display decoded video data.

Clause 19. The device of any of clauses 15-18, wherein the device comprises one or more of a camera, a computer, a mobile device, a broadcast receiver device, or a set-top box.

Clause 20. The device of any of clauses 15-19, wherein the device comprises a video decoder.

Clause 21. The device of any of clauses 15-20, wherein the device comprises a video encoder.

Clause 22. A computer-readable storage medium having stored thereon instructions that, when executed, cause one or more processors to perform the method of any of clauses 1-14.

Clause 23. A device for encoding video data, the device comprising: means for performing any of the methods of clauses 1-14.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining whether transform skip mode is used for a current block of the video data;
   based on transform skip mode being used for the current block, disabling level mapping for residual coding; and
   coding the current block without applying level mapping,
   wherein coding the current block without applying level mapping comprises coding the current block without calculating a predictor for a current coefficient based on neighboring coefficients and without adjusting the absolute value of the current coefficient based on the predictor.

2. The method of claim 1, further comprising:
   coding a flag indicative of whether a transform coefficient of the current block is non-zero, two flags indicative of whether an absolute value of the transform coefficient is greater than $j<<1)+1$, and a flag indicative of a parity of the transform coefficient in a first pass;
   coding a flag indicative of a sign of the transform coefficient and three flags indicative of whether the absolute value of the transform coefficient is greater than $j<<1)+1$ in a second pass; and
   coding a flag indicative of a remaining absolute value of the transform coefficient in a third pass,
   wherein j is indicative of a number of a flag.

3. The method of claim 1, further comprising:
   determining neighboring coefficient values that neighbor a current coefficient value of the current block; and
   determining a Rice parameter based on the neighboring coefficient values,
   wherein coding the current block is further based on the Rice parameter.

4. The method of claim 3, wherein the neighboring coefficient values comprise two left coefficient values, two above coefficient values and an above-left coefficient value.

5. The method of claim 3, wherein the neighboring coefficient values comprise two right coefficient values, two below coefficient values and a below-right coefficient value.

6. The method of claim 1, further comprising:
   determining information associated with neighboring coefficients neighboring a current coefficient of the current block; and
   based on the information associated with the neighboring coefficients, determining a context for the current coefficient;
   wherein coding the current block is further based on the context.

7. The method of claim 6, wherein the information comprises a syntax value for the neighboring coefficient.

8. The method of claim 6, wherein the information comprises a number of available neighboring coefficients.

9. The method of claim 1, further comprising:
   determining a syntax element related to residual coding for the current block; and
   determining a set of contexts for luma components and a set of contexts for chroma components for the current block,
   wherein coding the current block is further based on the set of contexts for luma components and the set of contexts for chroma components, and wherein if the syntax element is a first syntax element, the set of contexts for luma components and the set of contexts for chroma components is shared, and if the syntax element is a second syntax element, the set of context for the luma components and the set of contexts for chroma components are different.

10. The method of claim 1, further comprising:
    determining whether a number of remaining context coded bins for a current transform unit is greater than a multiplier multiplied by a size of a coding group multiplied by a number of remaining coefficient groups in the transform unit; and
    based on the number of remaining context coded bins for a current transform unit not being greater than a multiplier multiplied by a size of a coding group multiplied by a number of remaining coefficient groups in the transform unit, skipping a coding pass while coding the current block.

11. The method of claim 10, wherein skipping a coding pass comprises skipping a second coding pass.

12. The method of claim 1, wherein determining whether transform skip mode is used for a current block of the video data is based on video data from an encoded video bitstream, and wherein coding the current block without applying level mapping comprises decoding the current block without level mapping.

13. The method of claim 1, wherein determining whether transform skip mode is used for a current block of the video data is based on a rate-distortion value, and wherein coding the current block without applying level mapping comprises encoding the current block without level mapping.

14. A device for coding video data, the device comprising:
    memory configured to store the video data; and
    one or more processors implemented in circuitry and coupled to the memory, the one or more processors being configured to:
      determine whether transform skip mode is used for a current block of the video data;
      based on transform skip mode being used for the current block, disable level mapping for residual coding; and
      code the current block without applying level mapping,
      wherein to code the current block without applying level mapping the one or more processors are configured to code the current block without calculating a predictor for a current coefficient based on neighboring coefficients and without adjusting the absolute value of the current coefficient based on the predictor.

15. The device of claim 14, wherein the one or more processors are further configured to:
- code a flag indicative of whether a transform coefficient of the current block is non-zero, two flags indicative of whether an absolute value of the transform coefficient is greater than j<<1)+1, and a flag indicative of a parity of the transform coefficient in a first pass;
- code a flag indicative of a sign of the transform coefficient and three flags indicative of whether the absolute value of the transform coefficient is greater than j<<1)+1 in a second pass; and
- code a flag indicative of a remaining absolute value of the transform coefficient in a third pass,
- wherein j is indicative of a number of a flag.

16. The device of claim 14, wherein the one or more processors are further configured to:
- determine neighboring coefficient values that neighbor a current coefficient value of the current block; and
- determine a Rice parameter based on the neighboring coefficient values,
- wherein the one or more processors code the current block further based on the Rice parameter.

17. The device of claim 16, wherein the neighboring coefficient values comprise two left coefficient values, two above coefficient values and an above-left coefficient value.

18. The device of claim 16, wherein the neighboring coefficient values comprise two right coefficient values, two below coefficient values and a below-right coefficient value.

19. The device of claim 14, wherein the one or more processors are further configured to:
- determine information associated with neighboring coefficients neighboring a current coefficient of the current block; and
- based on the information associated with the neighboring coefficients, determine a context for the current coefficient,
- wherein the one or more processors code the current block further based on the context.

20. The device of claim 19, wherein the information comprises a syntax value for the neighboring coefficient.

21. The device of claim 19, wherein the information comprises a number of available neighboring coefficients.

22. The device of claim 14, wherein the one or more processors are further configured to:
- determine a syntax element related to residual coding for the current block; and
- determine a set of contexts for luma components and a set of contexts for chroma components for the current block,
- wherein the one or more processors code the current block further based on the set of contexts for luma components and the set of contexts for chroma components, and wherein if the syntax element is a first syntax element, the set of contexts for luma components and the set of contexts for chroma components is shared, and if the syntax element is a second syntax element, the set of context for the luma components and the set of contexts for chroma components are different.

23. The device of claim 14, wherein the one or more processors are further configured to:
- determine whether a number of remaining context coded bins for a current transform unit is greater than a multiplier multiplied by a size of a coding group multiplied by a number of remaining coefficient groups in the transform unit; and
- based on the number of remaining context coded bins for a current transform unit not being greater than a multiplier multiplied by a size of a coding group multiplied by a number of remaining coefficient groups in the transform unit, skip a coding pass while coding the current block.

24. The device of claim 23, wherein skip a coding pass comprises skip a second coding pass.

25. The device of claim 14, further comprising a camera, the camera being configured to capture the video data.

26. The device of claim 14, further comprising a display device, the display device being configured to display the video data.

27. The device of claim 14, wherein the device comprises a mobile phone.

28. A non-transitory computer-readable storage medium storing instructions, which, when executed by one or more processors, cause the one or more processors to:
- determine whether transform skip mode is used for a current block of video data;
- based on transform skip mode being used for the current block, disable level mapping for residual coding; and
- code the current block without applying level mapping,
- wherein to code the current block without applying level mapping the instructions cause the one or more processors to code the current block without calculating a predictor for a current coefficient based on neighboring coefficients and without adjusting the absolute value of the current coefficient based on the predictor.

29. A device for coding video data, the device comprising:
- means for determining whether transform skip mode is used for a current block of the video data;
- means for disabling level mapping for residual coding based on transform skip mode being used for the current block; and
- means for coding the current block without applying level mapping,
- wherein the means for coding the current block without applying level mapping is configured to code the current block without calculating a predictor for a current coefficient based on neighboring coefficients and without adjusting the absolute value of the current coefficient based on the predictor.

* * * * *